United States Patent
Jovanović et al.

(10) Patent No.: US 10,061,678 B2
(45) Date of Patent: Aug. 28, 2018

(54) AUTOMATED VALIDATION OF DATABASE INDEX CREATION

(71) Applicant: Microsoft Technology Licensing, LLC, Redmond, WA (US)

(72) Inventors: Andrija Jovanović, Belgrade (RS); Isidora Jovandić, Belgrade (RS); Dejan Kraković, Belgrade (RS); Miloš Aćimović, Belgrade (RS); Željko Nikoličić, Beograd (RS); Petar Lotrean, Smederevo (RS); Miroslav Grbić, Belgrade (RS); Đorđe Maksimović, Belgrade (RS); Svetlana Stanojević, Belgrade (RS)

(73) Assignee: Microsoft Technology Licensing, LLC, Redmond, WA (US)

(*) Notice: Subject to any disclaimer, the term of this patent is extended or adjusted under 35 U.S.C. 154(b) by 412 days.

(21) Appl. No.: 14/752,575

(22) Filed: Jun. 26, 2015

(65) Prior Publication Data

US 2016/0378634 A1    Dec. 29, 2016

(51) Int. Cl.
*G06F 17/00* (2006.01)
*G06F 11/34* (2006.01)
(Continued)

(52) U.S. Cl.
CPC ...... *G06F 11/3409* (2013.01); *G06F 11/3034* (2013.01); *G06F 17/30306* (2013.01); *G06F 17/30336* (2013.01)

(58) Field of Classification Search
CPC .................................................. G06F 11/3409
See application file for complete search history.

(56) References Cited

U.S. PATENT DOCUMENTS 6,223,171 B1 * 4/2001 Chaudhuri .......... G06F 11/3447
                                                    707/718
6,266,658 B1   7/2001 Adya et al.
(Continued)

FOREIGN PATENT DOCUMENTS

EP        1302870        4/2003

OTHER PUBLICATIONS

International Search Report and Written Opinion for PCT/US2016/039125 dated Sep. 28, 2016.
(Continued)

*Primary Examiner* — Hung Le
(74) *Attorney, Agent, or Firm* — Workman Nydegger

(57) ABSTRACT

Automated validation of the creation of indices in an environment that include multiple and potential many databases, such as perhaps a cloud computing environment. A validation module validates index impact of a created index by using a validation data store that contains validation data originating from a database collection. Index impact may be estimated by evaluating validation data generated prior to and after the creation of the index to thereby determine whether the created index results in overall improved query performance on the database collection for those queries that target the newly indexed database entity. Such validation data need not even contain private data that was contained within the query itself, and might be, for instance, query performance data, or execution plans associated with the query, with private data redacted.

22 Claims, 3 Drawing Sheets

(51) Int. Cl.
*G06F 17/30* (2006.01)
*G06F 11/30* (2006.01)

(56) References Cited

U.S. PATENT DOCUMENTS

| | | | |
|---|---|---|---|
| 7,047,231 B2 | 5/2006 | Grasshoff et al. | |
| 7,769,744 B2 | 8/2010 | Waas et al. | |
| 8,515,927 B2 | 8/2013 | Bailey et al. | |
| 8,621,051 B2 | 12/2013 | Agarwala et al. | |
| 8,626,729 B2* | 1/2014 | Whitehead | G06F 17/30336 707/696 |
| 8,706,701 B1 | 4/2014 | Stefanov et al. | |
| 8,805,800 B2 | 8/2014 | Narasayya et al. | |
| 2003/0093408 A1* | 5/2003 | Brown | G06F 17/30336 |
| 2005/0165741 A1 | 7/2005 | Gordon | |
| 2007/0136386 A1* | 6/2007 | Burger | G06F 17/30336 |
| 2007/0294272 A1* | 12/2007 | Anderson | G06F 17/30312 |
| 2009/0100004 A1 | 4/2009 | Andrei et al. | |
| 2010/0235221 A1* | 9/2010 | Naelon | G06Q 30/02 702/10 |
| 2010/0250504 A1* | 9/2010 | Balasubramanian | G06F 17/30306 707/696 |
| 2010/0257151 A1 | 10/2010 | Lohman et al. | |
| 2011/0055201 A1* | 3/2011 | Burger | G06F 17/30424 707/719 |
| 2012/0016881 A1* | 1/2012 | Hrle | G06F 17/30312 707/746 |
| 2012/0221534 A1* | 8/2012 | Gao | G06F 17/30312 707/692 |
| 2013/0060782 A1* | 3/2013 | Bailey, Jr. | G06F 17/30336 707/741 |
| 2013/0254210 A1* | 9/2013 | Morris | G06F 17/30312 707/741 |
| 2014/0201741 A1 | 7/2014 | Govindan et al. | |
| 2014/0278807 A1 | 9/2014 | Bohacek | |
| 2014/0279855 A1* | 9/2014 | Tan | G06F 17/30345 707/609 |
| 2015/0019487 A1* | 1/2015 | Buehne | G06F 17/30377 707/632 |
| 2015/0310045 A1* | 10/2015 | Konik | G06F 17/30339 707/741 |
| 2016/0378634 A1 | 12/2016 | Jovanovic et al. | |
| 2016/0378822 A1 | 12/2016 | Jovanovic et al. | |

OTHER PUBLICATIONS

International Search Report and Written Opinion for PCT/US2016/039126 dated Sep. 28, 2016.
2nd Written Opinion issued in PCT Patent Application No. PCT/US2016/039125 dated Jun. 16, 2017.
Office Action dated Jun. 15, 2017 cited in U.S. Appl. No. 14/752,620.
Ferdman, et al., "Clearing the Clouds: A Study of Emerging Scale-out Workloads on Modern Hardware", In Proceedings of the seventeenth international conference on Architectural Support for Programming Languages and Operating Systems, Mar. 3, 2012, 11 pages.
Schnaitter, et al., "Semi-Automatic Index Tuning: Keeping DBAs in the Loop", In the Proceedings of the VLDB Endowment, vol. 5, No. 5, Aug. 27, 2012, 12 pages.
Gibas, et al., "Online Index Recommendations for High-Dimensional Databases Using Query Workloads", In IEEE Transactions on Knowledge and Data Engineering, vol. 20, Issue 2, Feb. 2008, 15 pages.
"About the Missing Indexes Feature", Retrieved on: May 6, 2015 Available at: http://technet.microsoft.com/en-us/library/ms345524(v=SQL.105).aspx.
"Limitations of the Missing Indexes Feature", Retrieved on: May 6, 2015 Available at: http://technet.microsoft.com/en-us/library/ms345485(v=sql.105).aspx.
"International Preliminary Report on Patentability issued in PCT Application No. PCT/US2016/039125", dated Sep. 18, 2017, 6 Pages.
Office Action dated Dec. 19, 2017 cited in U.S. Appl. No. 14/752,620.

* cited by examiner

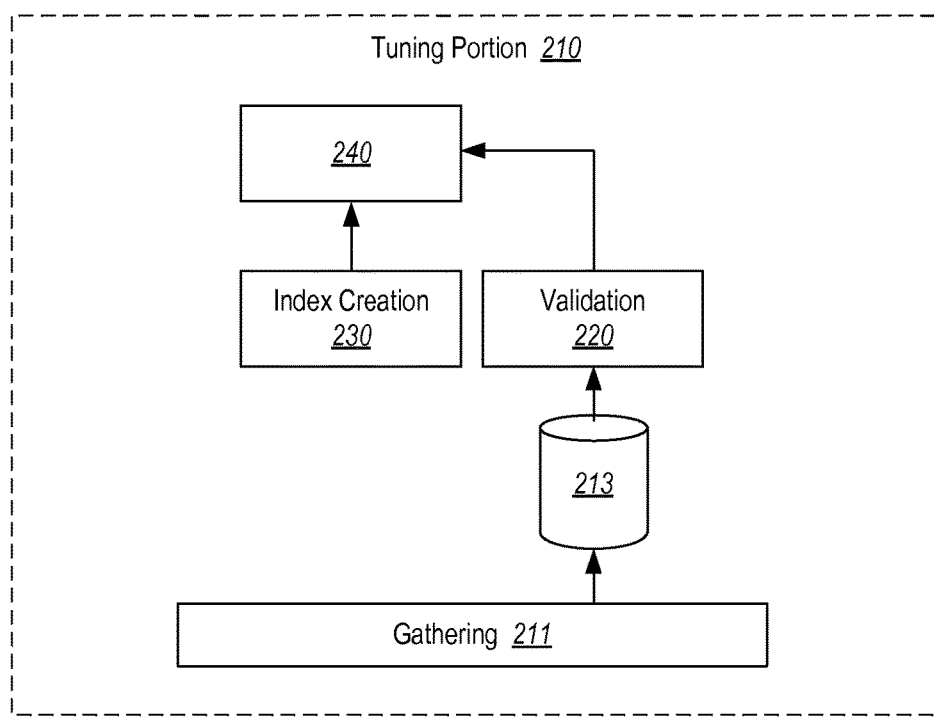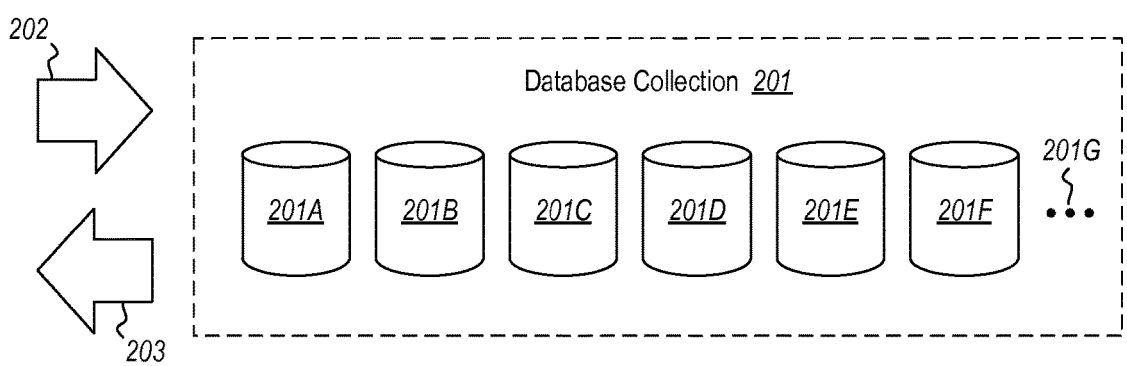
Figure 2

AUTOMATED VALIDATION OF DATABASE INDEX CREATION

BACKGROUND

Computing systems and associated networks have revolutionized the way human beings work, play, and communicate. Nearly every aspect of our lives is affected in some way by computing systems. The proliferation of networks has allowed computing systems to share data and communicate, vastly increasing information access. For this reason, the present age is often referred to as the "information age".

Databases allow some order to be imposed upon the vast world of information that is available. Rather than manually scan through all of the available data until the data of interest is found, queries may be issued to the database, allowing for retrieval of only the results of the query. To allow queries to be efficiently processed over one or more database entities (such as tables, views, and so forth) of one or more databases, the database entities are often indexed over one or more columns. The index essentially tells where data having parameters of particular values can be found. However, there are often a large variety of parameters represented within a database entities and/or a large number of possible database entities. Accordingly, indexing against all columns and values of all database entities becomes an infeasible task.

In order to improve performance of a database, databases are often "tuned". Tuning a database involves adjusting various configurations and structures of the database so that the database responds more efficiently to the queries that tend to be submitted to the database. One aspect of such tuning involves creating indexes on particular columns on particular database entities.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to a system that automatically validates index creation on a database entity in an environment that includes a collection of potentially multiple (and potentially many) databases. The validation module validates index impact of a created index by using a validation data store that contains validation data originating from the database collection. The validation data might include, for instance, metadata from queries made to the database collection. Index impact may be estimated by evaluating validation data generated prior to and after the creation of the index to thereby determine whether the created index results in overall improved query performance on the database collection for those queries that target the newly indexed database entity. Such validation data need not even contain private data that was contained within the query itself, and might be, for instance, query performance data, or execution plans associated with the query, with private data redacted.

Accordingly, an efficient mechanism for substantially automating the tuning of large database collections without requiring significant user time is described herein. During the tuning, if a particular index creation does not actually result in overall improved query performance against of the database collection, that index creation may be automatically reverted or a revision recommendation might be issued. The net result is substantial improvement of overall query performance on the database collection through simplified user interface, and allowing to be achieved what would be virtually impossible if the user themselves had to investigate each database for possible tuning opportunities.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 2 illustrates a system in which validation of index creations may occur by verifying improved overall query performance over the database collection for those queries that target the newly indexed database entity;

DETAILED DESCRIPTION

At least some embodiments described herein relate to a system that automatically validates index creation on a database entity in an environment that includes a collection of potentially multiple (and potentially many) databases. The validation module validates index impact of a created index by using a validation data store that contains validation data originating from the database collection. The validation data might include, for instance, metadata from queries made to the database collection. Index impact may be estimated by evaluating validation data generated prior to and after the creation of the index to thereby determine whether the created index results in overall improved query performance on the database collection for those queries that target the newly indexed database entity. Such validation data need not even contain private data that was contained within the query itself, and might be, for instance, query performance data, or execution plans associated with the query, with private data redacted.

Accordingly, an efficient mechanism for substantially automating the tuning of large database collections without requiring significant user time is described herein. During the tuning, if a particular index creation does not actually result in overall improved query performance against the database collection, that index creation may be automatically reverted or a revision recommendation might be issued. The net result is substantial improvement of overall query performance on the database collection through simplified user interface, and allowing to be achieved what would be virtually impossible if the user themselves had to investigate each database for possible tuning opportunities.

Some introductory discussion of a computing system will be described with respect to FIG. 1. Then, the automated validation of index creation will be described with respect to subsequent drawings.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor to thereby provision the computing system for a special purpose. The memory may take any form and may depend on the nature and form of the computing system. A computing system may be distributed over a network environment and may include multiple constituent computing systems.

Figure 1:
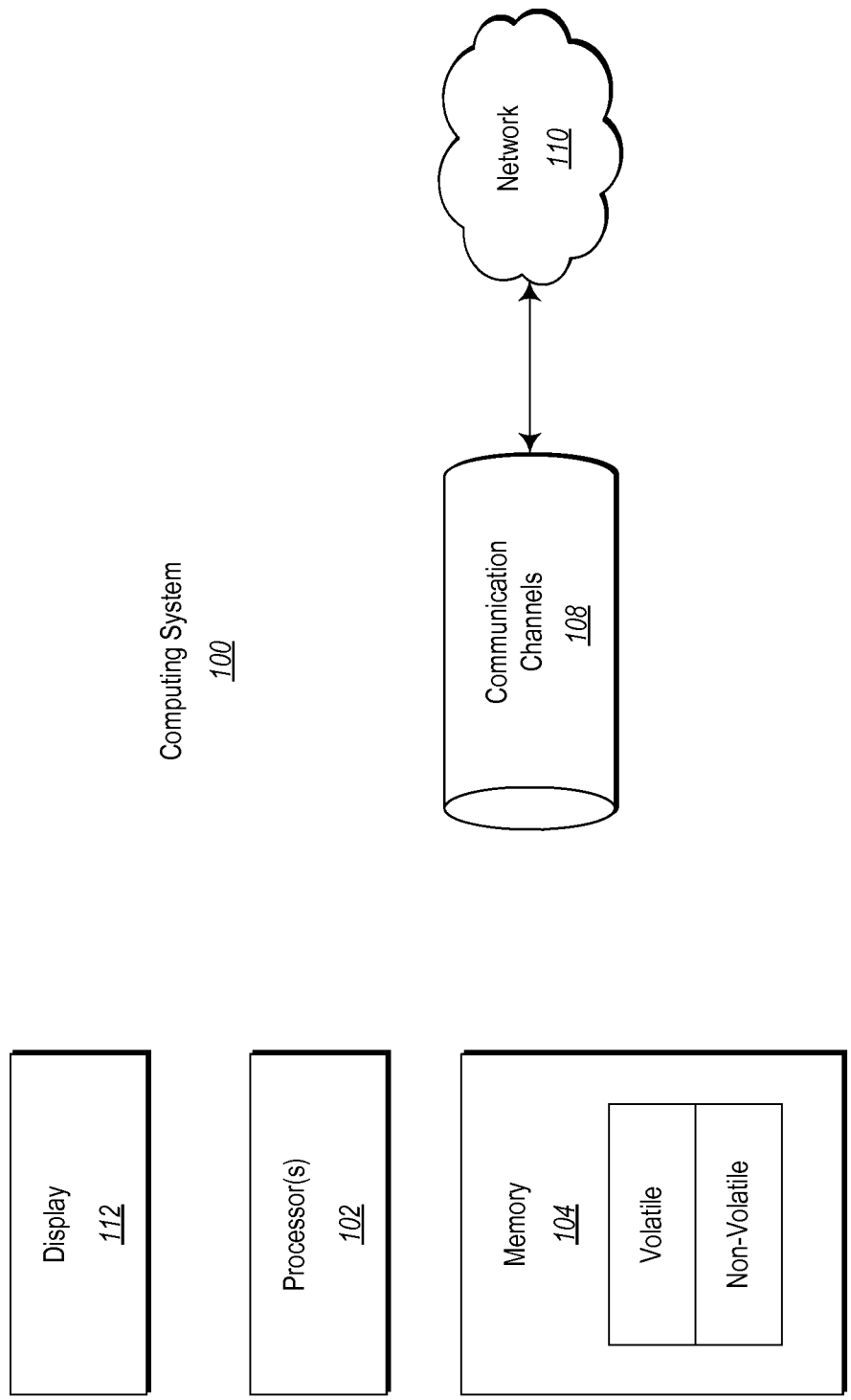
FIG. 1 abstractly illustrates a computing system in which some embodiments described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads). With such objects and processes operating upon the computing system, the computing system is the equivalent of a special purpose computer that functions for the special purpose accomplished by the objects.

In the description that follows, embodiments are described with reference to acts that are performed by one or more computing systems. If such acts are implemented in software, one or more processors (of the associated computing system that performs the act) direct the operation of the computing system in response to having executed computer-executable instructions, thereby converting and configuring the computing system for a more specialized purpose than without such direction. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other computing systems over, for example, network 110. The computing system 100 also includes a display 112, which may be used to display visual representations to a user.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. The computer executable instructions may be, for example, binaries or even instructions that undergo some translation (such as compilation) before direct execution by the processors, such as intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses, watches, and so forth) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

FIG. 2 illustrates a system 200 in which the formulation of index recommendations in the context of multiple databases may occur. The system 200 includes a collection 201 of databases. Queries may be submitted (as represented by arrow 202) that target one or more database entities of any, some, or all of the databases, and corresponding query results (as represented by arrow 203) are returned. In this description and in the claims, a "database" is broadly defined as any data store that may be queried against to obtain responses to the query. The database itself may contain structured data, unstructured data, semi-structured data, or combinations thereof.

Figure 3:
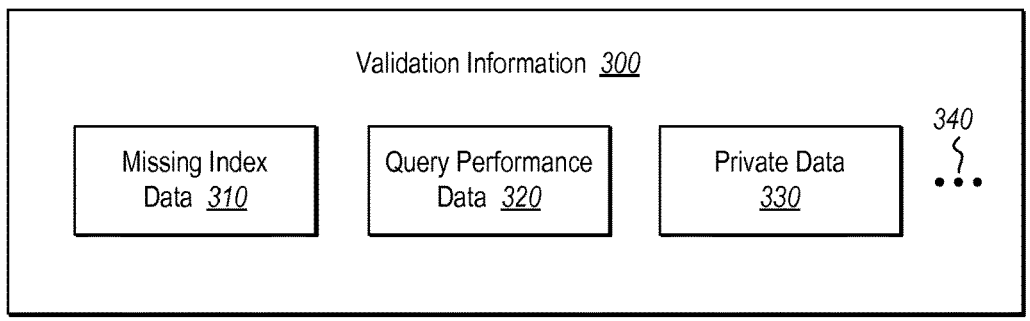
FIG. 3 illustrates validation information that is generated by the database collection of FIG. 2, which validation information is made available to the tuning portion of FIG. 2 and includes missing index data, query performance data, and private data.

In addition to queries (represented by arrow 202) and responses (represented by arrow 203) thereto, each of the databases generates additional validation data (as represented by arrow 204). FIG. 3 illustrates such validation data 300 and includes missing index data 310, query performance data 320, and private data 330. Such information may be even gathered live such that the information is gathered as it is generated. Of course, the validation data 300 may include other information as well as represented by the ellipses 340. Such validation data 300 may be generated on a per-database or on a per-database entity basis. However, the aggregate of such validation data from all databases is represented abstractly by arrow 204 in FIG. 2.

Each database includes multiple and perhaps very many database entities, such as tables, views, and the like. Each database entity keeps track of which parameters it is indexed on. A database entity may be indexed on a parameter so that matching values of that parameter may be quickly found, whether useful for a final or intermediate result of the query. In conventional databases, a parameter corresponds to a column of a database entity, and thus conventional indexes of a database entity are indexed by column. However, the principles described herein are not limited to how a parameter of a database entity is indexed.

In one example, a system view is present for each database engine instance, and it is that system view that keeps track of what parameters it is indexed on. If a query is received that targets that database entity, and the query is against a particular parameter which is indexed on for that database entity, the parameter index may then be used to allow a response without fully scanning the database entity in full. However, if a query is received that causes the query engine to look for an index that is missing (i.e., a missing index), the database entity (e.g., the system view corresponding to each database engine) tracks that missing index, counts how many queries resulted in triggering of that missing index, and even estimates how much performance gain may be accomplished if the missing index (a hypothetical index) was provided. Such is collectively referred to herein as "missing index" data 310.

The query performance data 320 may include information regarding measured performance in the processing of queries. Such performance information might include, for instance, the following measurements for queries in general (or perhaps broken down by type of query): a number of processors cycles used to process queries, an amount of each type of resource used to process the queries, and so forth. Such information might include, for instance, group statistics (e.g., average, mean, median, extend, and so forth) for the queries. Such group statistics may be grouped over a period of time (such as perhaps a given time interval (e.g., in hours, days or the like). Thus, the query performance data 320 may include time-wise measurements of performance of queries in general, or types of queries.

The database collection 201 is illustrated as including six databases 201A through 201F. However, the ellipses 201G represent that the principles described herein may apply to any collection 201 of multiple databases from as few as two databases, to an unlimited number of databases. For instance, the collection 201 may be a cloud computing environment such as a public cloud, a private cloud, or a hybrid cloud that includes a public cloud and a private cloud (and/or an on-premises environment), and potentially include hundreds, thousands, or even millions of databases or more.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The system 200 also includes a tuning portion 210 that serves to tune the database collection 201 to thereby improve the performance of the database collection. The tuning portion 210 includes a gathering module 211. The gathering module 211 is configured to gather at least a portion of the validation data 300. In one embodiment, the gathered information is provided into a validation data store 213. The validation data store 213 may be any type of store, such as a single database, or combination of databases, non-database storage, or any combination of the above. In one embodiment, the validation data store 213 may be a single database.

The gathering module 211 is configured to apply a privacy policy such that private information (e.g., the private information 330 of FIG. 3) generated by the databases within validation data 300 is not gathered by the gathering module 211. Accordingly, the privacy of those making queries (e.g., queries 202) into the database collection 210 is preserved. Such private data or information is customer sensitive data that is to be kept within a compliance boundary associated with the customer. For instance, the gathered information might include metadata associated with the queries, and not include the private data that is often included within the queries themselves.

As an example, in a cloud computing environment, each node may have a dedicated process which periodically collects data from the specified views on that node and pushes the data to a centralized storage location for all telemetry in that corresponding region of a cloud database service. From all regional telemetry locations the data is automatically extracted to the validation data storage 213.

The system 200 may include an index creation module 230. The index creation module 230 initiates creation of at least one corresponding index on at least one corresponding database of the database collection. As an example only, the index creation module 230 may use information gathered by the gathering module 211 into the validation data store 213 to decide which index to create on which database entity of which database. Alternatively, a user may simply instruct that an index be created on a corresponding database entity of a corresponding database. A hybrid of this would be that the index creation module 230 uses the information gathered by the gathering module 211 to formulate one or more recommended indexing tasks, and then the user selects one of the recommended indexing tasks. That said, the principles described herein are about validating an index creation, regardless of the cause of the index creation.

The system also includes a validation module 220 that operates to automatically validate index creation on a database entity. For instance, that aggregated validation data may be represented by the validation data 300 of FIG. 3. The aggregated validation data may be, for instance, the query performance data 320 of FIG. 3.

This automatic validation automatically validates index impact of the created index by using aggregated validation data gather by the gathering module 211 into the validation data store to verify that the index creation results in overall improved query performance on the database collection for those queries that target the newly indexed database entity. Note that "overall" improved query performance does not mean that the performance of every query that targets the newly indexed database entity will be improved as a result of the created index. In fact, the index may potentially cause some of such queries to perform worse than without the index. However, overall improved query performance means that there tends to be more query improvement that there is query regression as a result of the created index for those queries that target the newly indexed database entity.

Figure 4:
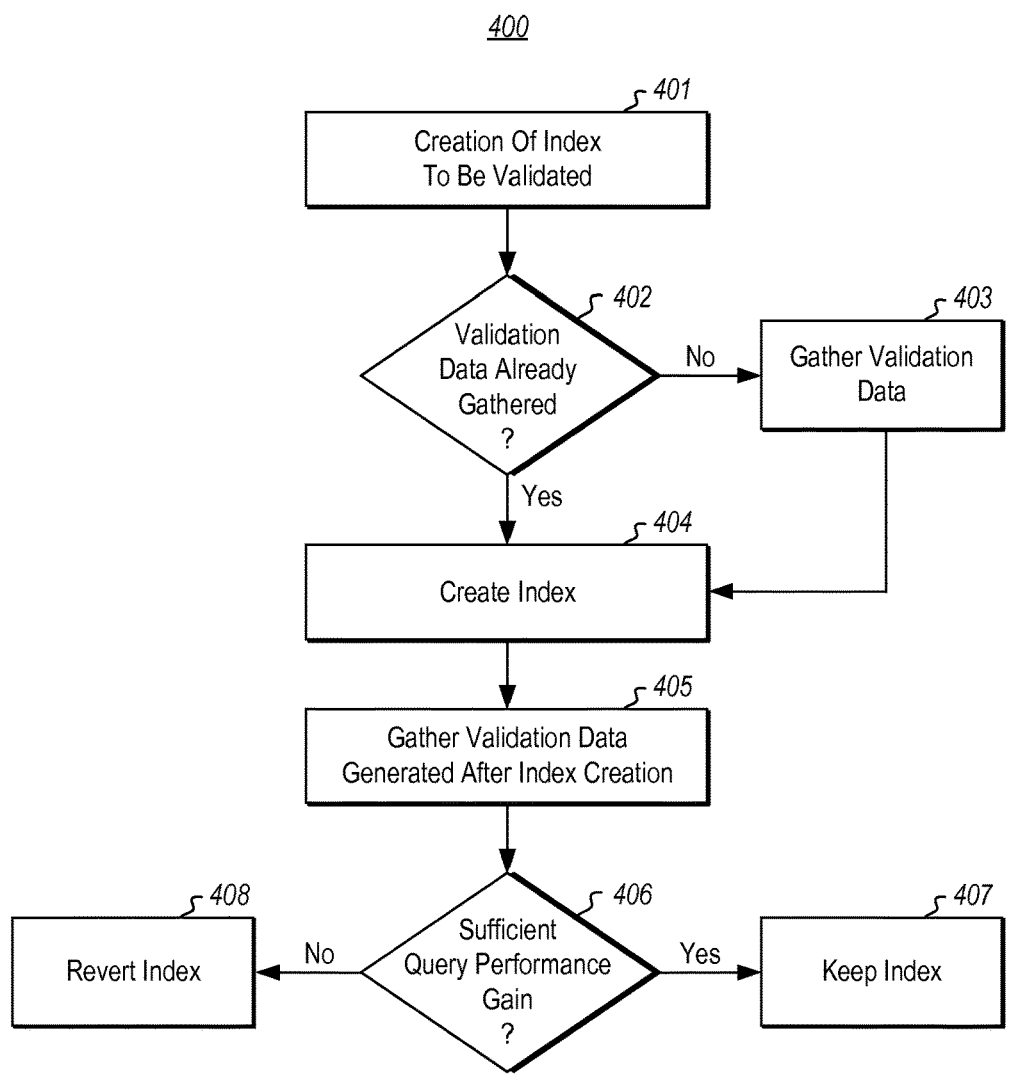
FIG. 4 illustrates a flowchart of a method for automatically validating the creation of an index.

FIG. 4 illustrates a flowchart of a method 400 for validating the creation of an index. The method 400 may be performed by, for instance, the validation module 220 of FIG. 2. First, the validation module determines that creation of the index is to be validated (act 401). As an example, referring to FIG. 2, the validation module 220 may detect that the index creation module 230 is about to create an index.

The validation module 220 then determines whether validation data has already been gathered (decision block 402). If so ("Yes" in decision block 402), then validation data already exists that can be evaluated as a benchmark for the period prior to the creation of the index. Accordingly, the index may be created (act 404). If the validation data for the period prior to index creation has not yet been gathered ("No" in decision block 402), then the validation data is gathered (act 403) prior to the index being created (act 404).

In the case of having already gathered the validation data ("Yes" in decision block 402), the validation data may have been continuously gathered live as the validation data is generated, with perhaps older validation data being discarded. This scenario is helpful in that the index may be immediately created, but has the downside of having to expend processing, network, and storage resources regardless of whether an index is going to be created, and thus such resources might not ever be used. This scenario may be helpful, however, if indices are frequently being created on the database collection, thereby increasing the likelihood that such resources will be helpful in validating an index. In the case of deferring the gathering of the validation data ("No" in decision block 402) until it is determined (act 401) that an index is to be created, there is the advantage that processing, storage, and network resources are utilized only when needed to validate the index creation. However, the disadvantage is that there is some delay prior to the index creation being created.

Once the index is created (act 404), the validation data generated after the index creation is gathered (act 405). The validation data generated before and after the index creation are then evaluated (act 406) to be able to determine whether or not there has been a significant overall query performance gain as applied to the database collection for those queries that target the newly indexed database entity. If there has been a significant overall query performance gain ("Yes" in decision block 406), then the index is kept (act 407). If there has not been significant query performance gain ("No" in decision block 406), then the index is reverted (act 408). The validation module 220 may, for instance, perform this reversion. In one embodiment, the validation decision may be referred to as an index impact of the created index.

The system 200 also includes a validation control module 240 that permits a user to control whether or not the validation module 220 validates improved overall query performance on the database collection as a result of an index that the user caused to be created. Also, the validation control module 240 may display output of the validation process, and allow a user to determine whether or not to keep or revert based on that result. For instance, the validation control module 240 may display output and controls on, for example, display 112.

The validation module 220 may be performed by a wide variety of created indexes. In one embodiment, the validation occurs using an impact verification model. The goal of the impact verification model is to observe per query data on how the index is behaving (i.e., observe whether the index improves overall query performance on the database collection) and arrive at the keep or revert decision previously described. Revert decisions are used to improve the model such that, eventually, the model should get to a state where the overwhelming majority of indexes are kept.

In accordance with the impact verification model, the index impact is determined by monitoring resource usage of individual customer queries. Monitored resources (such as CPU time, logical IO) are those that show how much work each query is supposed to be doing. A desirable index would reduce such resource usage (such as CPU usage and reads) by allowing better query plans to be used, at the cost of more writes due to having to update one more structure on disk. Improvements in logical resource usage regularly lead to improvements in physical resource usage (query duration, physical IO). However, in accordance with the principles described herein, physical resources and/or logical resources may be monitored. However, physical resource values tend to have inherent noise. Accordingly, some embodiments may simply measure logical resource usage.

The impact verification model enables collecting workload metadata, including customer queries, execution plans and their runtime stats over extended time period, and storing them within the customer database. For instance, in FIG. 2, such workload metadata may be the validation data that is stored within the validation data store 213. For instance, the index verification module may use the following information from the workload metadata: 1) for each query, the set of execution plans used for the query, 2) for each execution plan, its entire content, with private data being hidden from the plan to comply with the privacy policy, and 3) for each plan and each periodic interval, the following statistics: number of executions, CPU time used per execution (average and standard deviation), logical reads and per execution (average and standard deviation), and logical writes per execution (average and standard deviation).

The required workload metadata is automatically exhausted from the customer database, directly from database engine. In one embodiment, an eventing structure may be used to extract this metadata and place such into the validation data store 213. The eventing system may operate per database such that, if turned on, an event generating process on each database starts collecting the workload metadata from the corresponding database, including all the execution plans and their runtime statistics per time interval.

After the workload metadata is exhausted from database, a dedicated process being run on each node collects this metadata and pushes it to the corresponding regional telemetry location (not shown), from where it is extracted to the validation data store 213 over which the impact verification model is run. All the private data is removed from the execution plans within the engine. Each plan is exhausted once, when it is initially executed, while the runtime statistics are aggregated and exhausted periodically. Thus, the query plan is generated as live data.

An advantage of this approach is that the exhausted data is actually only metadata, with all the private data being effectively hidden to avoid violating any customer privacy policy. This whole process scales well across a large number of databases. It is fully automated and takes a reasonable amount of time to validate, in order to provide a big enough validation data sample both prior and after index creation, so that the verdict on the created index is extremely accurate.

Once the workload metadata reaches its destination store where the verification model is run (i.e., the validation data store 213), the following steps may be executed. First, noise is reduced by throwing away all queries that do not target the table over which the index was created. For queries that do target that table, a local repository of queries, plans, and runtime performance statistics for those queries and plans are merged across different plans and intervals to get the execution count, plus two metrics (average and standard deviation) for three different dimensions (CPU time used, logical reads, logical writes) in two distinct periods—before and after index creation.

These metrics to calculate statistics for Welch's t test. The null hypothesis is that the query performance was not changed by the index operation, and Welch's test gives us the level of statistical significance with which we can discard it. For each of the three resource dimensions: all queries for which Welch's test with a significance level of 0.99 does not reject the null hypotheses are thrown away. For the remaining queries, gains (or losses) are determined as follows: EstimatedQueryGain=ExecutionCount·(AvgUsageBeforeIndex−AvgUsageAfterIndex). The total gain/loss is: EstimatedTotalGain=Σ EstimatedQueryGain. The metric may be used to provide a verdict (i.e., keep or revert) for the created index, which empirically proved to be very accurate, is the following: if (EstimatedTotalGain[CPU]>0) then 'keep' else 'revert').

Accordingly, what has been described is an efficient mechanism for substantially automating the tuning of large collections of databases without requiring significant user time. The tuning is accomplished via the system validating indexes that improve the overall query performance of the collection of databases as a whole. The net result is substantial improvement of performance of the database collection through simplified user interface, and allowing to be achieved what would be virtually impossible if the user themselves had to investigate each database for possible tuning opportunities.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
a validation module, executing on the one or more processors, that operates to automatically validate creation of an index within a particular database entity in an environment that includes multiple database entities, the validation module configured to:
automatically validate an overall index impact of the created index on the entire environment that includes the multiple databases by using a validation data store that contains validation data originating from a plurality of databases, wherein validating the overall index impact includes considering at least:
a first performance impact of the created index on one or more first queries that utilize the created index; and
a second performance impact of the created index on one or more second queries that do not utilize the created index; and
automatically retaining or deleting the index based on a consideration of both the first performance impact and the second performance impact.

2. The system in accordance with claim 1, the validation data store comprising a database that contains aggregated validation data from the plurality of databases.

3. The system in accordance with claim 1, further comprising:
the validation data store.

4. The system in accordance with claim 1, further comprising:
at least one of the plurality of databases.

5. The system in accordance with claim 1, the plurality of databases at least partially contained within a cloud computing environment.

6. The system in accordance with claim 1, the validation module configured to automatically validate performance improvement by evaluating validation data generated prior to creation of the index, evaluating validation data generated after the creation of the index, and comparing the evaluations.

7. The system in accordance with claim 6, the validation module configured to recommend or decide to revert or keep the created index based on the comparison.

8. The system in accordance with claim 1, the validation data comprising query performance data.

9. The system in accordance with claim 1, the validation data comprising live workload data.

10. The system in accordance with claim 1, the validation data comprising metadata from queries issued against the plurality of databases.

11. The system in accordance with claim 10, the metadata comprising at least a portion of execution plans for performing queries against the database entity.

12. The system in accordance with claim 1, the validation data excluding private data from the one or more first queries and the one or more second queries issued against the plurality of databases.

13. The system in accordance with claim 1, the validation module configured to perform validation for indexes created on any of the plurality of databases.

14. The system in accordance with claim 1, the plurality of databases comprising at least a million databases.

15. The computing system in accordance with claim 1, wherein the first performance impact comprises a first weighted value and the second performance impact comprises a second weighted value, wherein consideration of both the first performance impact and the second performance impact comprises considering both the first weighted value and the second weighted value.

16. The computing system in accordance with claim 15, the first performance impact indicating a performance increase, the second performance impact indicating a performance decrease, wherein the index is automatically retained when the performance increase of the first performance impact is greater than the performance decrease of the second performance impact.

17. A computer-implemented method, executed at a computer system comprising one or more processors, for a validation module to automatically validate creation of an index within a particular database entity in an environment that includes multiple database entities, the method comprising:
the validation module determining that creation of an index is to be validated;
the validation module communicating with a validation data store that contains validation data originating from a plurality of databases; and
evaluating validation data from the validation data store that was generated before and after the creation of the index to estimate index impact on the entire environment that includes the multiple database entities, wherein validating the overall index impact includes at least:
estimating a first performance impact of the created index on one or more first queries that utilize the created index; and
estimating a second performance impact of the created index on one or more second queries that do not utilize the created index; and
automatically retaining or deleting the created index based on both the estimated first performance impact and the estimated second performance impact.

18. The computer-implemented method in accordance with claim 17, the evaluated validation data comprising metadata of at least the one or more first queries or the one or more second queries made to the plurality of databases.

19. The method in accordance with claim 17, the method being performed for a plurality of index creations for indexes corresponding to a plurality of database entities of the plurality of databases.

20. A computing system comprising a validation module, wherein the validation module is configured to at least:
automatically validate index creation of an index of a database entity of a database using live workload data of the database entity, the live workload data including validation data generated prior to creation of the index and validation data generated after the creation of the index;
evaluate the validation data generated prior to and after creation of the index to thereby generate an overall database performance impact estimate, including:
a performance increase estimate on one or more first queries that utilize the created index; and
an performance decrease estimate on one or more second queries that do not utilize the created index; and
automatically retain the created index based on identifying that the overall database performance impact is improved or automatically delete the created index when it is determined that the overall database performance impact is degraded.

21. The system in accordance with claim 20,
the validation module further configured to recommend a keep or revert decision with respect to the created index based on the index impact estimate.

22. The system in accordance with claim 20,
the validation module further configured to trigger a keep or revert decision with respect to the created index based on the index impact estimate.

* * * * *